March 2, 1943.  M. MENNESSON  2,313,002
OPERATIVE FLUID DELIVERY CONTROL DEVICE
Filed May 16, 1938  2 Sheets-Sheet 1

INVENTOR.
Marcel Mennesson,
Bailey & Carson ATTORNEYS.

March 2, 1943.  M. MENNESSON  2,313,002
OPERATIVE FLUID DELIVERY CONTROL DEVICE
Filed May 16, 1938  2 Sheets-Sheet 2

Inventor:
Marcel Mennesson,
Bailey & Carson
Attorneys

Patented Mar. 2, 1943

2,313,002

UNITED STATES PATENT OFFICE 2,313,002

OPERATIVE FLUID DELIVERY CONTROL DEVICE

Marcel Mennesson, Neuilly-sur-Seine, France; vested in the Alien Property Custodian Application May 16, 1938, Serial No. 208,303
In France September 11, 1937

1 Claim. (Cl. 137—139)

This invention relates to the controls of carburation devices for internal combustion engines and more especially but not exclusively to such controls for aircraft engines.

It is known that such carburation devices comprise numerous regulating elements such as controls for the supply of the combustible gases, for their richness, for economising, for altimetric correction, for choking, for limiting the admission, and otherwise.

If the aircraft are multi-engined and if the engines themselves have several carburetors, the controls of these elements require very long rod and link systems, subject to vibrations and disorders. As these controls should not have any play, there is considerable stiffness in the operation of the hand levers at the disposal of the pilot, or of any automatic control apparatus.

The present invention has for its object making such automatic or other controls simple and capable of being operated with greater ease.

According to the invention, one or more of the controls are acted upon through the intermediary of at least one relay operating under the effect of a variation of pressure created at a distance by a single apparatus, controlled by hand or automatically, and which can be located at any desired distance from the control to be acted upon.

The means for controlling the apparatus producing variations of pressure may comprise automatically operating manometric or barometric means which are themselves subjected to variations of pressure taken at suitably chosen points.

Such manometric or barometric means may be duplicated so that one can become damaged without interrupting the functioning of the control to be operated on.

Additionally the hand-operable and automatic means may be combined so that it is possible to modify at will the functioning of the automatic means.

In order that the invention may be better understood it will now be described with reference to the accompanying drawings, in which.

Figure 1:
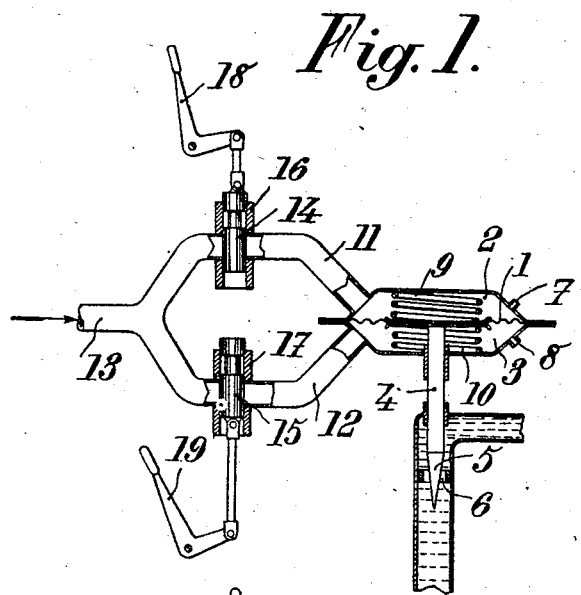
Fig. 1 shows, in diagrammatic vertical section, a control device, operable by hand and constructed according to a first method of carrying the invention into effect.

On Fig. 1 is shown diagrammatically a diaphragm 1 separating two distinct chambers 2 and 3, which diaphragm can actuate a rod 4 terminating in a needle 5 of suitably chosen shape, moving in a calibrated orifice 6. The section of the passage between the needle 5 and the calibrated orifice 6 controls the delivery of fuel utilised by the carburetor. For normal running, the diaphragm is maintained at its mean position by the action of two opposing springs 9 and 10. It is advantageous to employ a device with a double diaphragm such as that which forms the subject of U. S. application No. 140,992 filed May 5, 1937, in the same name. The diaphragm can equally be replaced by a piston, a slide valve, or the like.

The chamber 2 communicates with the exterior by a calibrated orifice 7 and can communicate, on the other hand, through a conduit 11, with a conduit 13 having fluid under pressure, for example compressed air.

Between the conduit 13 and the conduit 11 a slide valve 14 is located, capable of being moved in a sleeve 16 with the aid of a hand lever 18. This slide valve 14 has an annular portion of less diameter or a slot which permits variation of the section of the passage between the conduit 13 and the conduit 11.

In the same way, the chamber 3 communicates with the exterior by a calibrated orifice 8 and with the conduit 13 by a conduit 12, the communication between 12 and 13 taking place through the medium of a slide valve 15 adapted to slide in a sleeve 17 by the action of a hand lever 19.

The functioning of this device is as follows:

For cruising speed, there is no communication between the conduit 13 and the chambers 2 and 3. Consequently the diaphragm 1 is at its mean position and it determines the section of the orifice 6 which, naturally, must be suitably regulated.

If it is desired to enrich the mixture, for example for running with power, it is sufficient to act on the hand lever 19 so as to establish a communication between the conduit 13 and the conduit 12. In this way, the fluid under pressure enters the chamber 3, compressing the spring 9. The diaphragm moves towards the top of Fig. 1, increasing the free section of the calibrated orifice 6 and, consequently, the delivery of fuel.

If it is supposed, for example, that the fluid contained in the conduit 13 is at a constant pressure, the position of the needle 5 in the calibrated orifice depends solely upon the relation of the sections of the orifice 8, on the one hand, and of the narrowed part of the slide valve 15 which places the conduits 13 and 12 in communication, on the other hand, and it also depends upon the characteristics of the spring 9 which must be of suitable strength. In this way, for every position of the hand lever 19, when it establishes communication between 13 and 12, a corresponding position is given to the needle 5.

If, instead of increasing the delivery of fuel, it is desired to diminish it, which is the normal operation for effecting altimetric correction, it is sufficient to actuate the hand lever 18, the result of which will be to establish a communication between the conduit 13 and the chamber 2. The diaphragm is then moved towards the bottom and causes, in consequence, a diminution of the delivery of fuel and, in the same way for each position of the hand lever 18, there will be a corresponding position of the needle 5. It is obvious the conduits 11 and 12 can be as long as is necessary and it is possible, in this way, to locate the hand levers 18 and 19 at the disposal of the pilot, whilst the device constituted by the diaphragm and the needle can be located on the carburetors which can be as distant as desired from the pilot's position.

On Fig. 1 a device has been shown which is suitable to be mounted on a carburetor, but it should be understood that it is possible to branch, on the conduits 11 and 12, as many by-passes as desired, in order to act on as many carburetors as is necessary. It is equally possible to act with a single diaphragm or piston on two or a greater number of carburetors.

Figure 2:
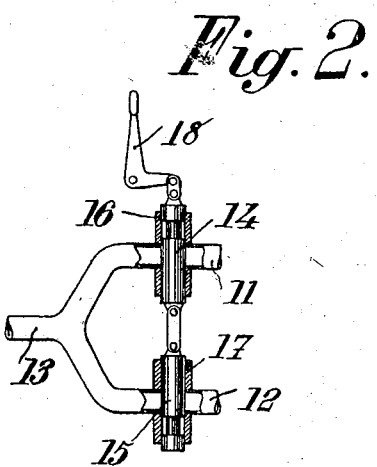
Figs. 2 and 3 show, similarly and respectively, two variations of this first method.

Fig. 2 shows a variation of the device according to Fig. 1, in which the two slide valves 14 and 15 are coupled between themselves and can be actuated by a single control 18, this control being, as shown on Fig. 2, a hand control, or it may be automatic.

The annular narrowed portions or slots of the slide valves 14 and 15 are arranged in such a way that at the mean position there is no communication between the conduits 11 and 12 and the conduit 13 and in such a way that a movement of the control 18 in one direction establishes communication between the conduit 13 and the conduit 11 for example, whereas a movement in the other direction establishes a communication between the conduit 13 and the other conduit 12.

In this way it is possible, with a single hand lever 18, to control either the enrichment, or the correction, by moving this hand lever to one side or the other of its mean position.

Figure 3:
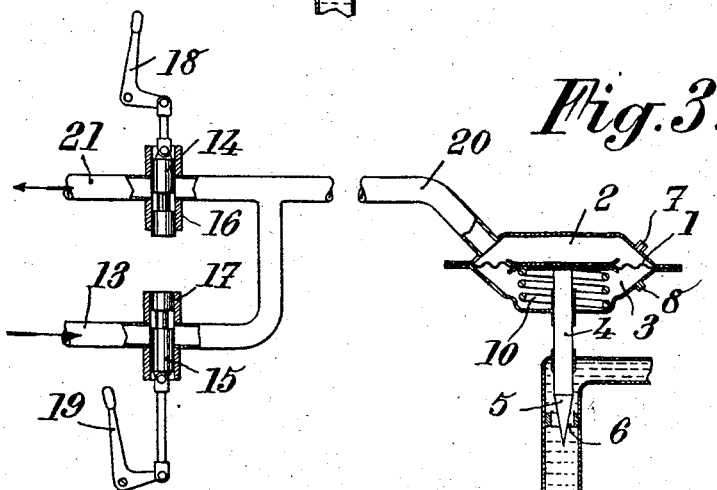

Fig. 3 shows another variation of the arrangement according to Fig. 1. Here, the diaphragm 1, which can be simple or double, always separates two chambers 2 and 3, communicating respectively with the exterior by calibrated orifices 7 and 8, but only the chamber 2 is capable of communicating, by the conduit 20, with the conduit 13 containing the fluid under constant pressure and only the chamber 3 contains a calibrated spring 10 which always tends to push the diaphragm towards the top of Fig. 2, which would correspond to the position of maximum delivery of the fuel.

Between the conduit 13 and the conduit 20 is interposed a slide valve 15, capable of sliding in a sleeve 17 under the control of a hand lever 19. The conduit 20 likewise communicates with the exterior, for example by a conduit 21; this communication having a variable section by the movement of a slide valve 14 with its annular narrowed portion or a slot, and capable of sliding in a sleeve 16 under the control of a hand lever 18.

The functioning of this device is as follows:

If the positions of the hand levers 18 and 19 are suitably chosen, so that the narrowed parts of the slide valves 14 and 15 establish a communication of suitable section between the conduits 20 and 21, on the one hand, and the conduit 20 and the conduit 13, on the other hand, and if account is taken of the section of the orifice 7 and of the characteristics of the calibrated spring 10, it is seen that it is possible to maintain the diaphragm 1 at its mean position, as indicated on Fig. 2. It suffices, in effect, if the pressure of the fluid contained in the chamber 2 balances the spring 10 in the mean position of the diaphragm. Under these conditions, the position of the needle 5 corresponds to the normal cruising speed.

If it is desired to enrich the mixture, it is sufficient to actuate hand lever 18 so as to increase the passage section between the conduit 20 and the conduit 21. In this way, the pressure in the chamber 2 diminishes and, under the action of the spring 10, the diaphragm again moves towards the top of the figure, increasing the free section of the orifice 6 and, for every position of the hand lever 18 there is a corresponding position of the needle 5.

If, on the contrary, it is desired to impoverish the mixture to make an altimetric correction, it is sufficient to actuate the hand lever 19 in order to increase the section which causes the conduit 20 to communicate with the conduit 13, which has the effect of increasing the pressure in the chamber 2 and compressing the spring 10 while diminishing the free section of the orifice 6. It should be noted that it is also possible to actuate the hand lever 18 by diminishing the passage section between 20 and 21. It is therefore seen that it is possible to perform the two operations with a single hand lever, the passage section between 20 and 13 then being replaced by an orifice of fixed section.

Of course, as in Fig. 1, the conduit 20 can be as long as is desired and can comprise as many by-passes as desired for controlling similar devices for as many carburetors as is necessary.

It may be advantageous to utilise, as source of fluid under pressure, the pressure of the air produced at a suitably chosen point, by the movement of the aircraft.

Figure 4:
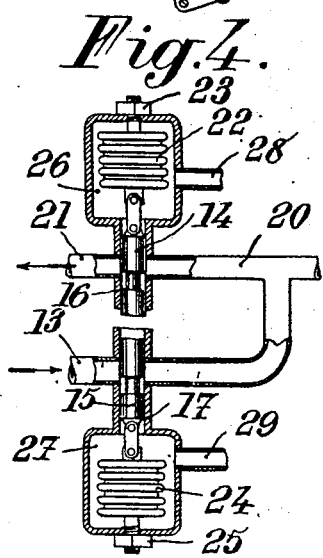
Fig. 4 shows, similarly, an automatic control device constructed according to a second method of carrying the invention into effect.

Fig. 4 shows the same device as Fig. 3, but for which the hand controls are replaced by automatic controls constituted by slide valves 14 and 15, controlled respectively by barometric capsules 22 and 24. The barometric capsule 22 is enclosed in a chamber 26 and it is adjustable by a nut 23. This chamber communicates, by a conduit 28, with a suitably chosen point of the intake pipe of the engine, for example. In this way, if the vicinity of full power is attained, the pressure increasing in the intake pipe, the capsule contracts, increasing the passage section between 20 and 21, which has for effect, as for Fig. 3, to move the diaphragm 1 towards the top and to increase the delivery of fuel. The capsule 24 is enclosed in a chamber 27 and is adjustable by a nut 25. This chamber communicates by the conduit 29, for example, with the atmospheric air and serves to effect automatic altimetric correction. In effect, if the atmospheric pressure diminishes, the capsule expands.

It carries along the slide valve 15 which increases the passage section between 20 and 13, which has the effect of increasing the pressure in the chamber 2 and, in consequence, diminishing the delivery of fuel.

Naturally, as has ben stated for Fig. 3, this assembly of the two capsules with their slide valve can be located at any distance from the carburetors and, in particular, it is advantageous to place these capsules in a position where they are subjected to the minimum vibrations, which is possible since the conduit 20 can have any length whatever.

Moreover, the adjusting nut 23 could be replaced by a hand control, for example a hand lever such as 18 (Fig. 3), which would allow the modifying of the functioning of the capsule 22 by the movement of this hand lever.

Figure 5:
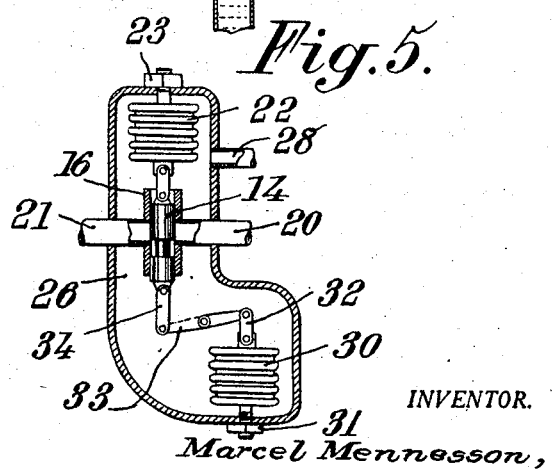
Figs. 5 and 6 show, similarly and respectively, two variations of this second method.

Fig. 5 shows a slide valve, such as 14, actuated by two capsules 22 and 30, subjected to the same pressure by the conduit 28 and adjustable respectively by the nuts 23 and 31, the capsule 30 transmitting to the slide valve 14 a movement in the same direction and of the same amplitude as the capsule 22, through the intermediary of the link 32, beam 33 and link 34.

A safety device is thus obtained. In effect, if one of the capsules should burst for example, the other capsule continues to operate without disturbing the efficient running of the apparatus.

It is well understood that each of the two slide valves 14 and 15 of the arrangement according to Fig. 4 can be actuated by two capsules, in a manner similar to that of Fig. 5.

In certain cases, the two correction and enrichment devices can also be actuated by a single capsule, by having recourse to an arrangement similar to that forming the subject of French specification No. 817,796 filed in the same name.

Figure 6:
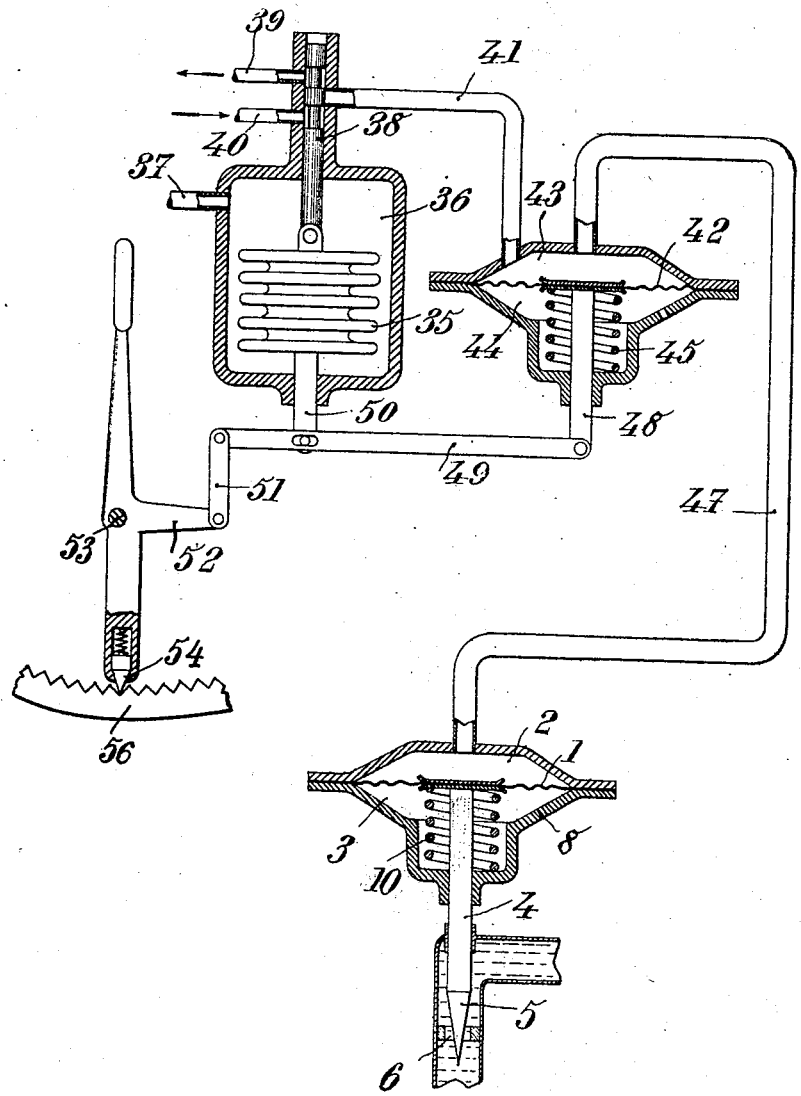

Fig. 6 shows an automatic device for creating pressures which are a function of the length of a barometric capsule, that is to say a function of the pressure to which this barometric capsule is itself subjected.

This device has, moreover, the advantage of utilising, as a source of fluid under pressure, a fluid the pressure of which can be variable.

It is constituted by a barometric capsule 35, located in a chamber 36, adapted to be disposed to receive pressure taken at a suitably chosen point of the engine, through the medium of the conduit 37. This capsule is coupled, on the one hand, to a distributor slide valve 38 permitting a conduit 41 to be placed in communication either with the inlet 40 for a fluid under pressure, or with an outlet 39 for this fluid, the communication of the conduit 41 with the conduits 39 or 40 taking place accordingly as the capsule 35 is deformed since it is connected to the slide valve 38 to move it in one direction or the other.

The channel 41 communicates with a chamber 43 separated by a diaphragm 42 from a chamber 44. In this chamber 44 is housed a calibrated spring 45 which tends constantly to push the diaphragm towards the top of the figure. This diaphragm is connected to a rod 48 which moves with the diaphragm and which is pivoted to a beam 49 which is connected to the rod 50 coupled to the capsule 35. This beam is also pivoted to a link 51, the other extremity of which is pivoted on the hand lever 52 movable around the spindle 53. The handle arm of the lever 52 extends downwardly and its end is provided with a bore in which is disposed a spring pressed pointed member 54. This pointed member 54 is adapted to engage triangular notches 55 of an arcuate stop member 56. This arrangement retains the bellcrank 52 in position so that movement of the bar 49 will not move the bellcrank but only the members 50 and 35. Finally, the chamber 43 communicates by a conduit 47 with one of the chambers 2 and 3, for example the chamber 2 of the device explained with reference to Fig. 3.

It has been supposed, in the case of Fig. 6, that the apparatus only controls a single movement of the diaphragm 1 situated on the carburetors or controls a group of carburetors. The conduit 47 in that case is united with the conduit 20 of Fig. 3, although when a device similar to that of Fig. 6 is utilised, it is necessary to eliminate the calibrated orifice 7 of Fig. 3.

This device functions in the following manner:

It has been supposed that it serves solely for making an altimetric correction of carburetors and, in consequence, for each pressure existing at the air inlet of the carburetor, there must be made to correspond a single well-determined pressure on the diaphragm in order to have a determined position of the needle 5.

To this end, it may be supposed, without this being a necessary condition, that the diaphragm 42 has the same surface and the same characteristics as the diaphragm 1, and that the spring 45 likewise has the same characteristics as the spring 10. In this way, for a given pressure in the chamber 43 and in the conduit 47, the same movements are obtained for the diaphragms 1 and 42. If it is supposed that the pressure to which the capsule 35 is subjected is varied, for example that it is diminished, the capsule expands and causes the slide valve 38 to establish a communication between the conduits 40 and 41. The fluid under pressure enters the chamber 43, forcing the diaphragm 42 towards the bottom against the action of the spring 45.

The movement towards the bottom of the diaphragm 42 and, in consequence, of the rod 48 will also result in displacing the capsule 35 towards the bottom by the action of the beam 49 and of the rod 50 and this movement takes place until the slide valve 38 obturates the communication between the conduits 40 and 41.

At this moment there exists in the chamber 43 a pressure which is determined by the characteristics of the spring 45 and which is a function of the expansion of the capsule 35. For each value of the expansion of this capsule, there is, in the chamber 43, a different pressure. As can be seen, this pressure is solely a function of the characteristics of the spring 45 and in no way of the pressure of the fluid contained in the conduit 40. If, inversely, the pressure increases in the chamber 36, the capsule contracts, establishes a communication between 39 and 41, causing a fall of pressure in the chamber 43 and a movement of the diaphragm 42 towards the top and, in consequence, of the capsule 35, until there is obturation of the passage between 39 and 41, which determines a new pressure in the chamber 43. The diaphragm or diaphragms, such as 1, are subjected to the same pressure as the diaphragm 42 and therefore effect a movement of the same amplitude and in the same direction.

Finally, the hand lever 52 enables the position of the slide valve 38 to be modified with respect to the orifices of the conduits 39, 40 and 41 for a same position of the diaphragm 42. It therefore permits an initial adjustment to be made of the apparatus or even the operation of the apparatus by hand, if by chance the functioning of the capsule becomes defective.

It should be noted that a diaphragm has been shown in the different figures, but it is quite obvious that any piston or slide valve can be utilised quite as well, the principle of operation always remaining the same.

It is obvious that a similar device can be utilised for effecting the enrichment or for any other operation and recourse can be had, as fluid under pressure, to any fluid such as air under pressure or suction, oil, or otherwise.

The invention is not limited to the precise forms or details of construction described, as these may be varied to suit particular cases.

What I claim is:

Control means for valves and the like, comprising a chamber, a pressure responsive member located in said chamber and adapted to be connected to the mechanism to be controlled, a source of control fluid under pressure, a conduit connected to said chamber for supplying control fluid to one face of said responsive member, spring means acting on the other face of said pressure member, a manometric capsule, automatic means for creating pressures which are a function of the pressure to which said capsule is subjected, said automatic means comprising a chamber, a diaphragm dividing said chamber, the space in the chamber on one side of said diaphragm being connected in said conduit, a compression spring acting on said diaphragm, a rod, one end of which is connected with said diaphragm, a bell crank lever adapted to be operated by hand, a link pivoted to one arm of said bell crank lever, and a bar pivoted to the other end of said link and to said rod to connect the rod and the link, and means connecting said bar intermediately to said manometric capsule, whereby said bell crank lever and its connected elements constitute a supplementary hand actuated control means.

MARCEL MENNESSON.